United States Patent [19]

Davison, Jr.

[11] 4,235,447
[45] Nov. 25, 1980

[54] LOW FRICTION OIL CONTROL PISTON RING

[75] Inventor: Ellard D. Davison, Jr., 38 Newberry Place, Grosse Pointe Farms, Mich. 48236

[73] Assignee: General Motors Corporation, Detroit, Mich.

[21] Appl. No.: 923,016

[22] Filed: Jul. 10, 1978

[51] Int. Cl.³ .............................................. F16J 9/06
[52] U.S. Cl. .................................. 277/138; 277/208
[58] Field of Search ............... 277/138, 215, 208, 139, 277/214, 213

[56] References Cited

U.S. PATENT DOCUMENTS

| | | | |
|---|---|---|---|
| 1,565,299 | 12/1925 | Wendel | 277/215 |
| 2,554,289 | 5/1951 | Anderson | 277/138 |
| 3,191,946 | 6/1965 | Hamm | 277/138 |
| 3,195,903 | 7/1965 | Hesling . | |
| 3,214,182 | 10/1965 | Herbruggen | 277/215 |
| 3,573,874 | 4/1971 | Hill | 277/208 |
| 3,645,174 | 2/1972 | Prasse | 277/208 |

OTHER PUBLICATIONS

Engineer's Handbook of Piston Rings, Seal Rings, Mechanical Shaft Seals, 8th Edition, Koppers Co., Inc., Metal Products Division.

*Primary Examiner*—Robert I. Smith
*Attorney, Agent, or Firm*—Robert J. Outland

[57] ABSTRACT

A low friction oil control piston ring for an internal combustion engine has a cylinder engaging outer surface of shallow wave-like configuration having a plurality of spaced cylinder engaging annular ridges smoothly blended with intermediate shallow valleys connected by oil passages with the interior of the ring. The number and size of the oil passages and their positioning along the sides of the valley walls are selected to provide a balance between friction reducing oil pressure development on the ring face and the ring oil scraping efficiency. Radial grooves may be provided in the ring upper surface as flow paths for engine blowby gases.

3 Claims, 7 Drawing Figures

LOW FRICTION OIL CONTROL PISTON RING

This invention relates to internal combustion engines and, more particularly, to low friction oil control piston rings for such engines. More specifically, the invention relates to oil rings having low friction hydrodynamic oil film developing wiping surfaces combined with vented valleys for carrying away excess oil from the cylinder walls.

Piston and piston ring assemblies in current use in today's automotive type internal combustion engines are in general characterized by extremely good control of oil loss to the engine combustion chambers combined with long wear, commonly exceeding 100,000 miles of vehicle operation without replacement of the piston rings being required. Various types of oil rings configurations are used; however, the type most commonly used in automotive engines at present consists of a pair of thin steel rings or rails having chrome plated wearing surfaces which are held in engagement with the cylinder wall by a spring steel expander. In larger heavy duty engines, self-loading solid dual land oil rings are sometimes used.

In considering various ways in which engine efficiency might be improved to obtain better utilization of petroleum fuel supplies, I have found reports indicating that a substantial portion of engine friction is due to the forces of the engine piston rings acting upon the cylinders. It is my belief that a substantial portion of such friction is a result of the constant scraping action of the engine oil rings, and I have thus concluded that engine efficiency could be improved by providing a low friction design oil ring capable of controlling oil lubrication on the cylinder walls while substantially reducing the friction forces developed by movement of the piston rings within the cylinders.

The present invention provides a low friction oil control piston ring design in which an oil film developing waved surface is provided to reduce friction development. The cylinder engaging surface of the ring includes a plurality of axially spaced circumferential ridges having intermediate shallow valleys smoothly blended with the ridges to form a shallow wave-like pattern. Oil control is provided by oil return passages extending from the valleys to the ring interior, the number and size of the passages and their positioning on the sides of the valleys being selected to balance the oil control and ring friction reducing requirements. If desired, radial grooves may be provided in the ring upper surface of the oil ring to carry blowby gases from the upper cylinder engaging edge of the ring to the interior thereof.

Piston rings of the foregoing waved outer surface configuration may be made in varying types, including hollow back designs loaded by a spring steel expander and solid self-loading configurations. The wearing surfaces of such rings may be coated in conventional manner with any suitable wear improving substance such as chromium, molybdenum, phosphate or the like. Preferably, the ring gap is made as small as possible to aid oil control while still minimizing the friction producing scraping force of the ring against the cylinder.

These and other features and advantages of the invention will be more fully understood from the following description of certain preferred embodiments of the invention taken together with the accompanying drawings.

Figure 1:
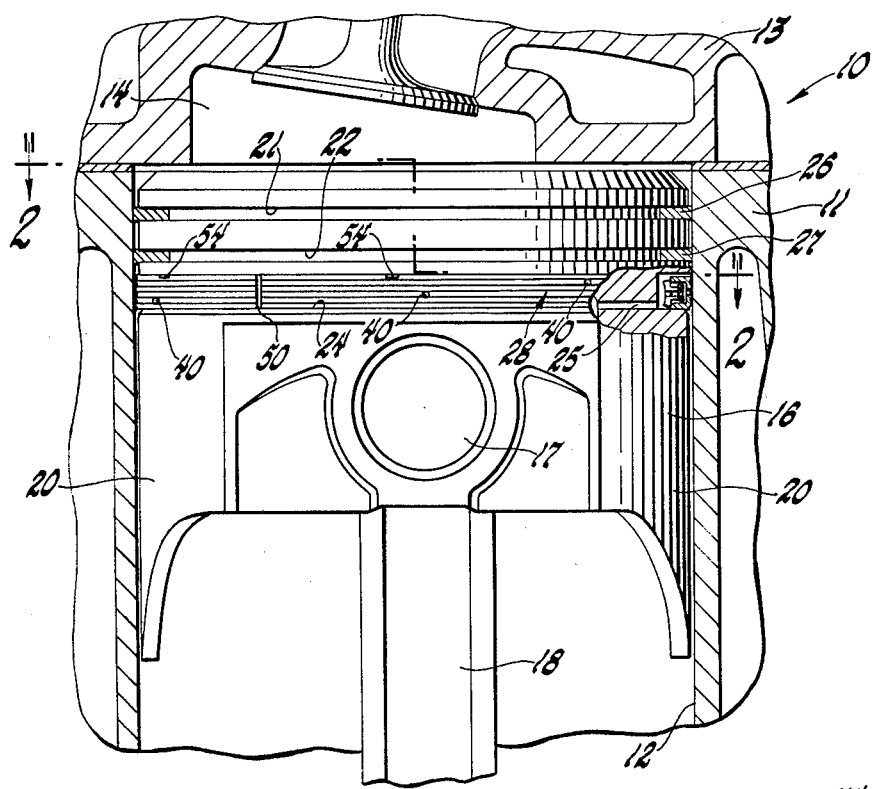
FIG. 1 is a cross-sectional view of a portion of one cylinder and combustion chamber of an internal combustion engine, showing a piston and ring assembly therein including a low friction oil ring in accordance with the present invention.

Referring now to the drawings in detail, FIG. 1 illustrates an internal combustion engine generally indicated by numeral 10. Engine 10 includes a cylinder block 11 having a cylinder 12, one end of which is closed by a cylinder head 13 incorporating a combustion chamber recess 14 at the end of the cylinder.

Within the cylinder 12 there is reciprocably mounted in conventional fashion a piston 16 connected by means of a piston pin 17 and connecting rod 18 with a conventional crankshaft, not shown. The piston conventionally includes a skirt having opposite portions 20 which engage the walls of the cylinder to absorb thrust loads, the cylinder walls being lubricated in conventional fashion to prevent excessive wear of the piston skirt and cylinder wall.

The upper portion or head of the piston 16 is provided with three annular grooves including first and second compression ring grooves 21, 22, respectively, and an oil ring groove 24 located below the compression ring grooves. Ring groove 24 has approximately twice the axial thickness of the compression ring grooves, and the back of the groove is vented through passages 25 in the piston wall to the interior of the piston, the cylinder and the engine oil sump, not shown, below the cylinder.

As illustrated, the compression ring grooves 21, 22, respectively, carry conventionally shaped compression rings including a barrel faced top compression ring 26 and a taper faced second compression ring 27. In the oil ring groove 24 there is disposed a low friction oil control piston ring 28 formed in accordance with the principles of the present invention.

As is common in internal combustion engines, the piston rings in the grooves on the engine piston are primarily responsible for controlling the escape of compression and combustion gases from the combustion chamber space 14 to the engine crankcase while at the same time controlling the escape of lubricant from the cylinder walls and crankcase up into the associated combustion chamber during the reciprocating motions of the piston through the usual intake, compression, expansion and exhaust strokes in the more common four-stroke engine or the compression and expansion strokes of a two-stroke engine. Commonly, the piston assembly and cylinder walls are lubricated by oil, sprayed or splashed from the crankshaft.

The primary oil control is accomplished by the oil ring, which is the bottom ring in the ring belt. This ring scrapes oil from the cylinder walls downwardly toward the crankcase or inwardly to the inner side of its ring groove and through passages such as 25 to the cylinder and piston interior from which it is returned by gravity to the oil sump. Thus the lower oil ring controls the amount of oil reaching the second compression ring. This ring in turn scrapes downwardly a certain amount of the oil which reaches it and controls the amount of oil reaching the top compression ring. The top ring also bears some portion of the oil control responsibility, with a certain small portion of the lubricating oil which passes the upper ring entering the engine combustion chamber and being burned or otherwise lost through the engine exhaust.

In the present invention, the function of the various rings is the same as indicated above. However, the design of the oil control ring 28 is such as to substantially reduce its friction loss during reciprocation over the wall, while still maintaining adequate oil control.

Figure 3:
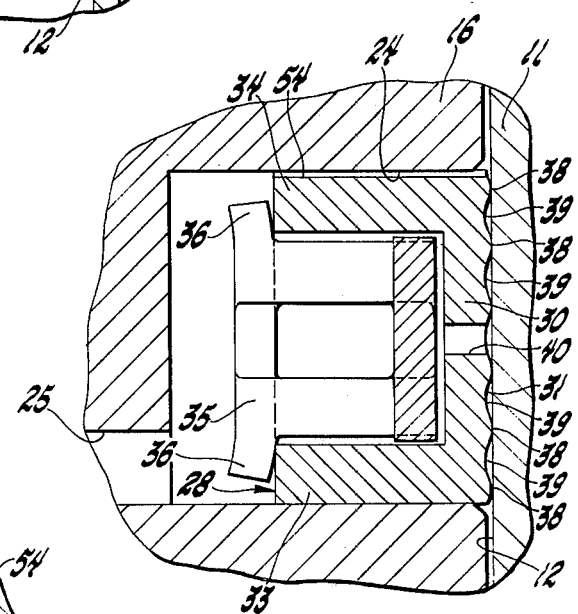
FIG. 3 is an enlarged cross-sectional view illustrating further details of the low friction oil ring assembly in the engine of FIG. 1.
Figure 2:
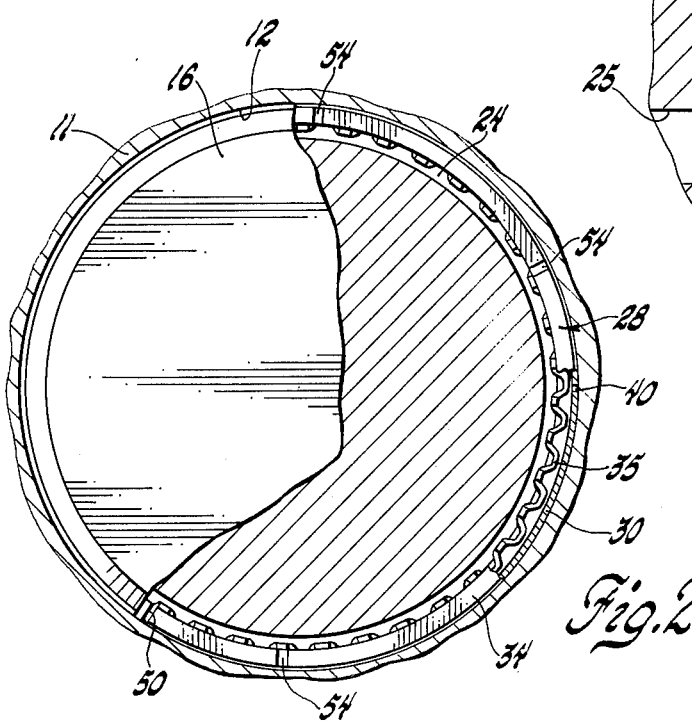
FIG. 2 is a cross-sectional view taken generally in the planes indicated by the line 2—2 of FIG. 1 and showing further details of the piston and ring configuration.

In the embodiment shown in FIGS. 1–3, the oil control ring 28 comprises a steel annulus of generally U-shaped cross section, having the central position 30 of the "U" facing outwardly to define a cylinder engaging outer surface 31, while the legs 33, 34 of the "U" define the lower and upper sides, respectively, of the piston ring. A conventional spring expander 35 is mounted partially within the open center portion of the U-shaped ring, having ears 36 which engage the inwardly extending upper and lower legs so as to urge the ring into engagement with the wall of the cylinder in conventional manner.

The cylinder engaging surface 31 of the ring is formed with a plurality of axially spaced circumferentially extending ridges 38 with intermediate shallow valleys 39 which are blended together, as best seen in the cross-sectional view of FIG. 3, to form a smoothly curved shallow wave-like pattern, the ridges being of equal diameter so as to simultaneously engage the wall of the cylinder.

The number and configuration of the ridges and valleys may vary; however, it seems preferable at present that there be at least four ridges and no less than three intermediate valleys of relatively shallow extent, whereby the angled sides of the valleys are capable of developing hydrodynamic oil films for supporting the ring slightly away from the surface of the cylinder wall during reciprocating movement of the ring in the cylinder. The depth of the valleys may be only a few thousandths of an inch and preferably would not be greater than about one-quarter of the distance between adjacent ridges.

To promote the oil control capabilities of the ring 28 by carrying excess oil away from the individual valleys, each of the valleys 39 is connected with the interior of the ring surface by a suitable passage 40 extending from the bottom of the valley to the ring interior and connected thereby with the bottom of the associated ring groove 24. At least one passage 40 is provided for each valley and more may be provided, if desired, preferably spaced equally around the periphery of the ring.

The diameter or size of the passages 40 is selected, in correlation with other factors, to provide a balance of oil flow from the cylinder surface which provides adequate oil control while leaving a thin oil film on which the ring may ride for the reduction of ring friction. While the passage 40 in FIG. 3 is shown centered in the valley, it is equally possible to move the passage upwardly or downwardly on the upper and lower side walls of its respective valley so as to control, as desired, the pressure developed by the upper and lower valley edges adjacent the passage during upward and downward lubrication of the piston ring. In this manner, both oil control and ring face pressure development may be varied during the upward and downward movements of the ring, as to which differing conditions apply.

Figure 5:
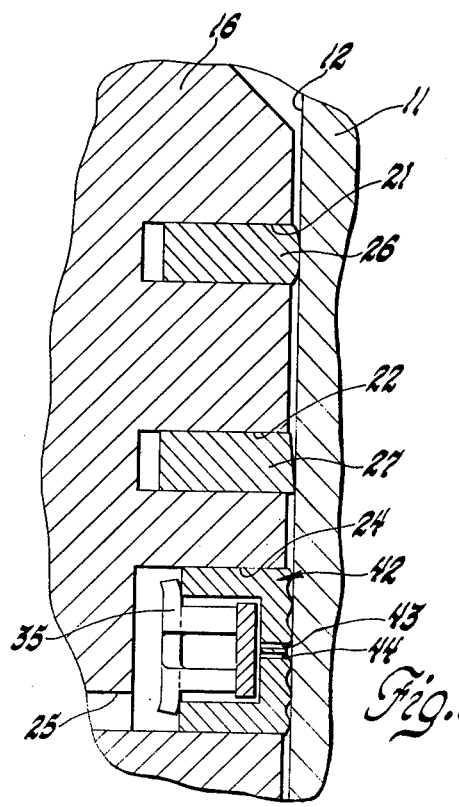
FIG. 5 is an enlarged cross-sectional view of a portion of a piston assembly similar to that of FIG. 1, but containing a slightly modified embodiment of low friction oil control ring.

FIG. 5 illustrates an alternative embodiment of oil ring 42 wherein dual passages 43, 44 are provided which separately connect the upper and lower portions of each valley with the interior of the piston ring. In this way, the separate passages can be individually positioned, as desired, either closer to the bottom of the valley or higher up on the sides thereof in order to properly control the pressure developed therein. In other ways the configuration of the oil control ring 42 of FIG. 5 is similar to that of FIGS. 1–3.

Figure 6:
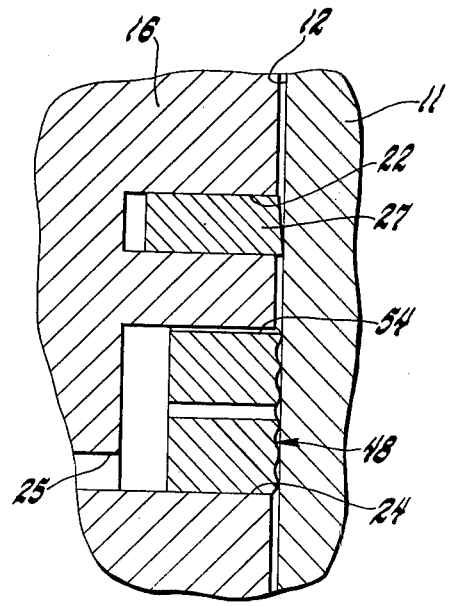
FIG. 6 is a cross-sectional view of another piston assembly containing yet a third embodiment of low friction oil control piston ring.

FIG. 6 shows a differing embodiment of oil control ring comprising a split ring 48 of rectangular cross section. This ring is used without an expander and is formed to have inherent tension, when installed, to provide its own internal cylinder engaging force. The design of the ring face and the passages connecting the valleys with the ring interior are essentially the same in the embodiment of FIG. 6 as in the previously described embodiments.

In all of the oil control ring embodiments disclosed, there is provided a suitable ring gap 50 to permit installation of the ring on the piston. Preferably this ring gap is made as small as possible to reduce the amount of oil which may bypass the ring at this point. In automotive engine piston rings, a gap as small as about 0.010 inch may be provided in the newly installed condition.

Another feature which is optionally included in all of the above described oil control ring designs is the provision on the upper face of the ring of a plurality of radially extending grooves 54. These grooves provide passages between the upper surface of the ring and the upper face of the associated ring groove 24 which direct blowby gases, coming down from the engine combustion chamber past the compression rings, inwardly from the cylinder wall into the inner side of the ring groove and then through passages 25 to the piston interior without crossing the face of the oil control ring.

This has the benefit that the blowby gas flow does not interfere with the oil film development which supports the oil ring on the surface of the cylinder, while at the same time the passage of blowby gases through the back of the ring groove aids in carrying oil, entering the ring groove through the passages 40, from the back of the ring groove into the cylinder interior for return to the oil sump.

Figure 4A:
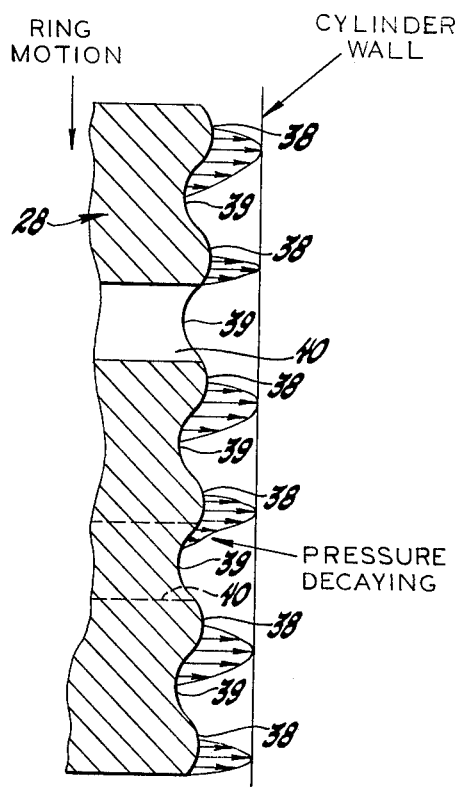
FIGS. 4a and 4b are diagrammatic views presenting conceptual visualizations of the manner of hydrodynamic oil film pressure development on the piston ring surface during reciprocating motion of the piston within the cylinder.
Figure 4B:
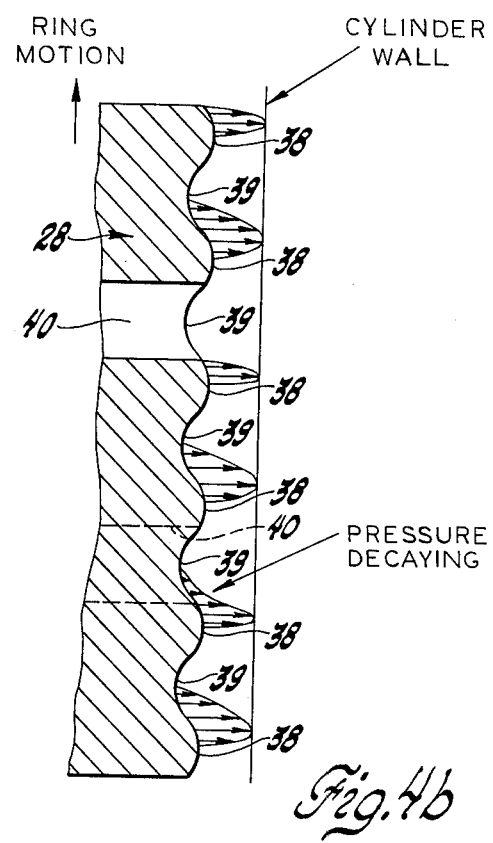

In operation of an engine having a piston ring design in accordance with the present invention, the reciprocation of the piston and the recurring cyclic pressures obtained during repetitive engine cycles create varying conditions whereby gas flows and oil films on the cylinder walls interact to provide a continuously changing set of conditions for operation of the piston rings. FIGS. 4a and 4b are intended to represent visualized concepts of conditions encountered on the outer surfaces of oil rings according to the present invention during engine operation. It should be understood that the oil film pressure patterns and ring configurations illustrated are for explanatory purposes only and are not intended to represent actual values or dimensions.

Referring first to FIG. 4a, there is shown a representational sectional view of a portion of the piston ring 28 as it might appear during downward motion of the piston. The section is taken through a location at a passage 40 extending to the back of the ring from the second valley from the top thereof. Also the section indicates a point near where a second passage 40 extends from the second valley from the bottom to the interior of the ring, that passage 40 being shown by dashed lines. It will be noted that the six ridges 38 of the ring face are equally spaced over the face of the ring, the upper and lower ridges being relatively close to the edges thereof.

It is considered, as the drawing indicates, that hydrodynamic oil film pressures will be developed on the upper sides of each of the valleys as the ring moves downwardly along the cylinder wall. It is here theorized that full pressures will be developed only along those portions of the ridge to valley walls where there is no interruption of the contour. Such full pressure development is thus shown below the first, third and fifth ridges from the top. At the fourth ridge a lower pressure is indicated in view of the effect of the nearby passage 40, while at the second and lowest ridges the pressure is further reduced, in the first case because of the immediate through passage 40 and in the second because of the short distance between the ridge and the lower edge of the piston ring.

In like manner, the opposite effect is shown in FIG. 4b as the piston ring moves upwardly. Here, it is theorized full pressure will be developed on the upper sides of the second, fourth and sixth ridges at the particular locations shown in the cross-sectional view. Also, a reduced pressure will be developed at locations near a passage 40 as shown on the upper side of the fifth ridge, while lowest pressures will be developed at the passage locations and at the top of the ring as shown, respectively, on the upper sides of the third and first ridges. Clearly, at the locations of the passages 40, as well as at the leading edges of the ring, a lubricant removal or scraping process takes place which causes some of the lubricant along the cylinder wall to be displaced toward the rear of the piston ring for carrying to the cylinder interior through the passages 25 in the piston.

From the foregoing visualized description, it should be apparent that, through proper matching of the ring face configuration with the sizes and locations of openings 40, it is possible to provide a low friction oil control ring which utilizes developed oil film pressures to ride over the surface of the associated cylinder while at the same time providing a high degree of oil control by wiping excess oil from the cylinder surface and carrying it, through passages provided, to the oil sump or scraping it downwardly along the cylinder wall. This action may be aided by the use of radial grooves in the ring upper surface to carry blowby gases to the cylinder interior without passing over the face of the oil ring.

While the invention has been described by reference to certain embodiments chosen for purposes of illustration, it should be understood that numerous changes could be made within the scope of the inventive concepts disclosed, and it is accordingly intended that the invention not be limited except in accordance with the following claims.

The embodiments of the invention in which an exclusive property or privilege is claimed are defined as follows:

1. In combination in an internal combustion engine,
   means defining a lubricated cylinder closed at one end,
   a piston reciprocally movable in the cylinder and having a head portion opposing the closed end of the cylinder and a skirt which engages the walls of the cylinder to absorb thrust loads during reciprocating movement therein, the piston being provided with a plurality of outwardly opening circumferential piston ring grooves including at least one compression ring groove located closely adjacent the head end of the piston and at least one oil control ring groove disposed on the skirt side of said at least one compression ring groove with means venting the back of the oil ring groove to the piston interior for draining oil delivered thereto,
   a compression piston ring in each of said at least one compression ring grooves, and
   the improvement comprising a low friction oil control piston ring in said at least one oil ring groove, said oil control ring comprising,
   a split annular metal ring having flat upper and lower sides, an inner wall and a generally cylindrical outer wall,
   said outer wall having formed thereon a plurality of axially spaced circumferential ridges with intermediate shallow valleys blended together as viewed in cross-section to form a smoothly curved shallow wave-like pattern, said ridges being of equal diameter and thereby adapted to simultaneously engage the cylinder wall, and
   oil return pasasages communicating said valleys with said inner wall and the back of said ring groove to carry excess oil from the valleys to the ring interior for return through the piston interior to the engine sump, the openings of said return passages into the valleys extending up their respective sides and spaced from the adjacent peaks of the ridges to control the hydrodynamic oil pressure developed on said valley sides during reciprocating motion of the ring in said lubricated cylinder.

2. The combination of claim 1 wherein said oil control piston ring further includes
   radial grooves traversing said upper ring side to carry blowby gases from adjacent the ring outer wall to the interior thereof.

3. A combination in accordance with either of claims 1 or 2 wherein the depth of the valleys of said low friction oil control piston ring is not greater than about one quarter of the distance between adjacent ridges whereby in operation the development of hydrodynamic bearing oil films by the angled sides adjacent the ridges is encouraged.

* * * * *